United States Patent [19]

Bliss

[11] 4,021,010

[45] May 3, 1977

[54] METHOD AND APPARATUS TO OVERCOME AIRCRAFT CONTROL PROBLEMS DUE TO WIND SHEAR

[76] Inventor: John H. Bliss, 2740 Graysby Ave., San Pedro, Calif. 90732

[22] Filed: Aug. 29, 1975

[21] Appl. No.: 608,408

[52] U.S. Cl. .......................... 244/182; 73/178 T; 235/150.22; 244/188; 340/27 SS
[51] Int. Cl.² .................. G05D 1/08; G05D 1/12
[58] Field of Search .............. 73/178 R, 178 T; 235/150.2, 150.22; 244/77 A, 77 D, 182, 183, 188; 318/583; 340/27 R, 27 SS

[56] References Cited

UNITED STATES PATENTS

| | | | |
|---|---|---|---|
| 3,033,035 | 5/1962 | Snodgrass | 73/178 T |
| 3,105,660 | 10/1963 | Lenefsky et al. | 244/77 D |
| 3,711,042 | 6/1973 | Rempfer et al. | 244/77 D |
| 3,868,497 | 2/1975 | Vietor | 244/77 A X |
| 3,892,374 | 7/1975 | Lambregts | 244/77 D |
| 3,920,966 | 11/1975 | Knemeyer et al. | 244/77 D X |

Primary Examiner—Stephen G. Kunin
Attorney, Agent, or Firm—William W. Haefliger

[57] ABSTRACT

The inventive system requires that normal approach indicated airspeed and a predetermined approach groundspeed be used as the approach criteria, whichever is the least, compared to its own predetermined index value. These two values are the commanding functions fed to a fast/slow indicator and to any autothrottle device on the approach, along with a "caution tailwind" warning device to warn the pilot whenever the groundspeed exceeds true airspeed by 5 knots or more, for example. If this warning activates, he should consider cancelling the approach and choose an approach from a different direction, determined by surface wind and his drift at the time of cancellation. This condition is caused by a tailwind component at altitude, the value of which the pilot can determine from his airspeed and groundspeed indications.

23 Claims, 4 Drawing Figures

CASE 1

CASE 2

CASE 3

LEGEND

——————— GROUND-SPEED NEEDLE READING

— — — — — INDICATED AIR-SPEED NEEDLE READING

— · — · — TAIL-WIND WARNING

▲ INDICATED AIR-SPEED INDEX

⋀ GROUND-SPEED INDEX

CASE 4

CASE 5

METHOD AND APPARATUS TO OVERCOME AIRCRAFT CONTROL PROBLEMS DUE TO WIND SHEAR

BACKGROUND OF THE INVENTION

This invention relates generally to aircraft flight control, and more particularly concerns method and apparatus to aid in overcoming problems of aircraft control that arise due to the existence of wind shear.

Weather and wind have always been of great importance to the aircraft pilot. From the experience of the Wright Brothers, who chose a place with favorable wind and weather for their experiments, to the modern jet pilot, most of the weather factors have been solved by technology and the environment of the modern jet airliner, with the use of high altitudes, radar, and the advanced state of knowledge called aerodynamics.

Along with the advance of large, massive airplanes there has emerged a problem area called "wind shear". It has been with us from the beginning of aviation, but becomes a problem of major proportions when a massive airplane depends on its own acceleration to deal with it. Consequently, there have been many accidents involving wind shear, and very likely many caused by it which were not attributed to it. Only recently has its importance been explored and apppreciated. The more information investigators compile, the more it is realized that wind shear is a very serious problem. It is also complex enough to elude any simple easily understood solution.

While pilots commonly add some airspeed to accommodate a known wind shear condition, nothing in aviation today provides for the unanticipated wind shear. The only forewarning a pilot can receive is from another pilot reporting its existence from flying through it himself. Even if forwarned, the pilot only has his own guesswork to rely on to deal with it, and the condition may change or even reverse itself by the time he actually encounters it. There are no means presently in existence on board any aircraft which provides the pilot with information on his present condition as regards windshear, let alone what may be ahead. He is totally committed to fly his approach maintaining an airspeed, whether manually or on auto-pilot. These problems can even be compounded by the use of auto-pilot and auto-throttle.

A wind shear which leaves the airplane thrust-deficient near the ground can be particularly dangerous, as described in the following:

As the airplane descends on the final approach he encounters a steadily increasing tail-wind, which requires a constant power, slightly above normal to maintain constant airspeed. This occurs whether using auto-throttle or manual control. A distance short of the runway, the tail-wind decreases and his airspeed rises calling for a decrease in power to hold his desired airspeed. Now, still short of the runway in a slight but steady head-wind, the airspeed reduces rapidly due to low power, and the pilot now has to add power to land on the runway, but it takes time for the engines to accelerate. He has done everything according to accepted practice, but he had another accident attributed to "pilot error", because he didn't have enough airspeed to reach the runway. This type of wind shear can be particularly insidious, because this can occur without any significant turbulence, and with such a gradual variance as to be barely perceptible. There have been several recent accidents, of this very nature.

This is but one illustration of the problems associated with wind shear. It is the object of my invention to solve such problems and produce a system and procedure whereby these problems are inherently solved within the system and procedure as far as feasible.

SUMMARY OF THE INVENTION

It is a major object of the invention to provide a method and simple apparatus, to provide reliable information from which the pilot may rapidly and accurately determine the power requirements of the aircraft in order to execute landing approach or take-off in a safe manner, under a wide variety of wind shear conditions.

In this regard, at every instant during an airplane's flight, there exists a quantitative relationship between indicated airspeed, wind component and groundspeed. At every instant airspeed, wind component and groundspeed have a calculable value relative to each other. When one of these three values change, there is always an instantaneous change in one or both of the others. Groundspeed cannot change instantaneously any more than one can drive his car 80mph and instantly change the speed to 40mph. As an airplane traverses different layers of air on the final approach there may be instantaneous changes in wind component which instantaneously changes airspeed, and the pilot accelerates or decelerates the airplane to get his airspeed back. As long as these instantaneous changes do not exceed the operating range of his airplane and his skill, it is possible to operate within these parameters. There are times when the airspeed excursions exceed a controllable condition of flight. When this happens close to the ground it can be catastrophic. Airspeed is completely at the mercy of what changes occur in wind component, knot for knot. A sudden drop of 20 knots in wind component decreases 20 knots off the airspeed. Groundspeed can only change subject to the limits of airplane acceleration.

Basically, the invention contemplates utilizing groundspeed information and integrating it into the normal approach airspeed information as an additional minimum parameter for a safe approach to a landing. Usable groundspeed information for this purpose is available to the pilot at the present time only from an inertial navigation system (INS). INS information can be integrated into an automatic approach system more readily and completely by utilizing a desired total vector, calculated by using the runway direction and expected groundspeed derived by subtracting two-thirds of the surface headwind component from the normal expected approach groundspeed. Using this expected total vector inserted in the INS as the primary criteria, and applying localizer and glideslope information corrections to it, should be the best way to interject INS information into the approach problem. The remaining portion of this description will deal primarily with how the invention will solve the approach wind shear problem, assuming the pilot is making a manual approach; but the same principles are assumed to apply to any automatic approach system where they may be applicable.

In its apparatus aspects, the ivention contemplates display of groundspeed along with airspeed, whether on the same instrument in the form of an additional coaxial needle registering on the same speed scale, or an apparently moving L.E.D. indicating indice mounted so as to read on the indicated airspeed scale either within the instrument or on an additional glass or transparent face, or a digital readout within or in close proximity to the airspeed indicator, or any type of display or use of groundspeed integrated with airspeed, so that the described procedures and devices are utilized, whether visually or incorporated into any automatic approach system or used in any other display such as a "heads up" display.

In its method or procedural aspects, the invention enables the intelligent determination of power to be applied to the aircraft during a landing approach where wind shear conditions are present, the method involving the following basic steps:

a. monitoring deviation of actual airspeed from desired landing airspeed, and deviation of the actual groundspeed from desired landing groundspeed, and b. employing such deviations to provide an indication from which the pilot may quickly determine whether engine power should be increased or decreased.

In its apparatus aspects the invention basically comprises:

a. first means for monitoring deviations of actual aircraft airspeed from desired landing airspeed, and deviation of actual aircraft groundspeed from desired landing groundspeed, and b. second means coupled to said first means for providing an indication from which the aircraft pilot may quickly determine whether engine power should be increased or decreased.

These and other objects and advantages of the invention, as well as the details of an illustrative embodiment, will be more fully understood from the following description and drawings, in which:

DRAWING DESCRIPTION

DETAILED DESCRIPTION

The use of this type system requires that normal approach indicated airspeed and a predetermined approach groundspeed be used as the approach criteria, whichever is the least, compared to its own predetermined index value. These two values are the commanding functions fed to a fast/slow indicator and to any auto-throttle device on the approach, along with a "caution tailwind" warning device to warn the pilot whenever the groundspeed exceeds true airspeed by 5 knots or more, for example. If this warning activates, he should consider cancelling the approach and choose an approach from a different direction, determined by surface wind and his drift at the time of cancellation. This condition is caused by a tailwind component at altitude, the value of which the pilot can determine from his airspeed and groundspeed indications.

Figure 1:
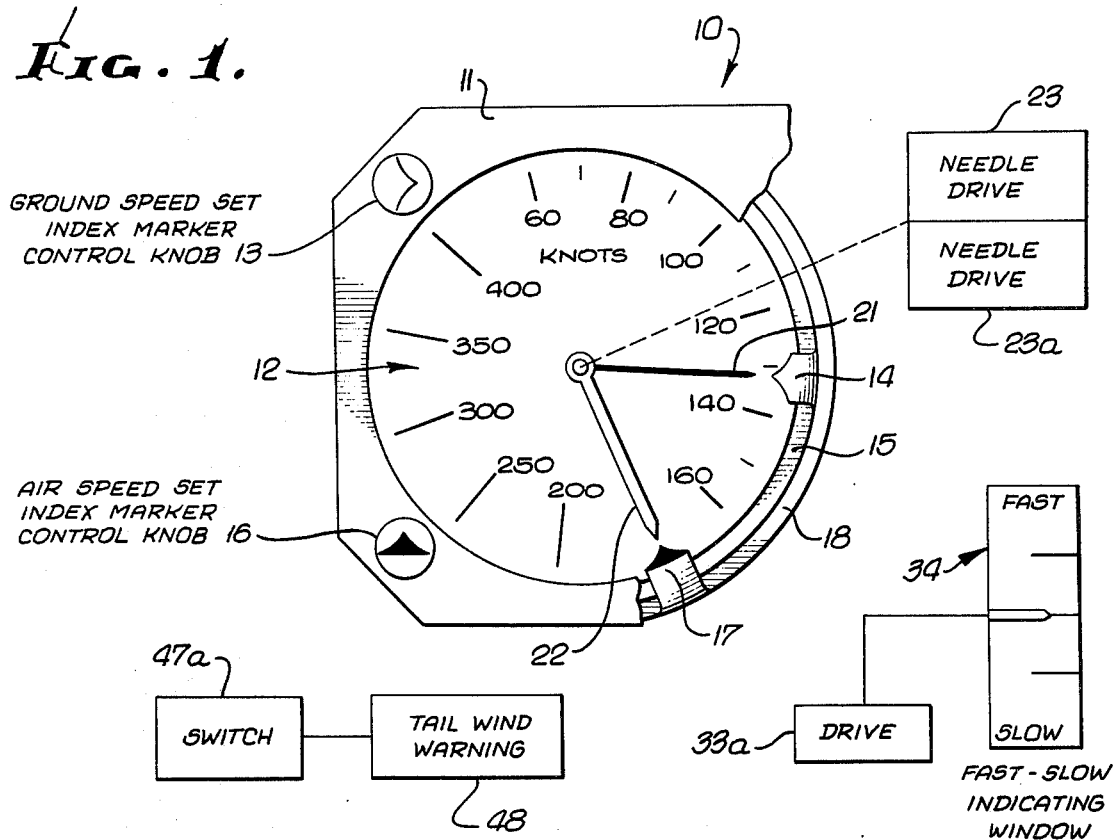
FIG. 1 is an air craft instrumentation arrangement.

Referring to FIG. 1 a combined airspeed and groundspeed indicator 10 includes a housing 11 and a dial face 12, the latter having speed markings in knots as shown. A calculated or index groundspeed value is "set up" or selected on the indicator, as by adjusting or rotating the knob 13, which shifts the marking 14 on rotary bezel 15 about needle axis 20. Also, a calculated or index airspeed value is set up or selected on the indicator, as by adjusting or rotating the knob 16, which shifts the marker 17 on rotary bezel 18 about axis 20. Markers 14 and 17 are closely adjacent the speed markings on the dial face.

In this regard, the airspeed index value is set in the conventional manner to a normal approach indicated airspeed. Also, the groundspeed index value is typically set as follows: first convert the normal approach indicated airspeed into true airspeed using altitude and temperature corrections at the field elevation, then subtract two-thirds the surface headwind component, not to exceed 20 knots. These are merely representative values and do not limit the scope of the present invention; also, to set the groundspeed index for take-off, the same type of corrections are applied to V2 speed (the intended lift-off speed and initial climb-out speed) and the pilot monitors these needles relative to these indexes. The preceeding explanation of utilizing groundspeed an airspeed during the final approach are assumed as a general explanation of this system and not to restrict the use of this type procedure. For instance, groundspeed can be relative to a runway or also relative to an aircraft carrier deck, or different speed values can be used without changing the philosophy of the procedures.

The actual or indicated groundspeed is represented by the rotary position of needle 21 in FIG. 1, and the indicated airspeed is represented by the rotary position of coaxial needle 22. Suitable drives for the needles are shown at 23 and 23a.

Figure 2:
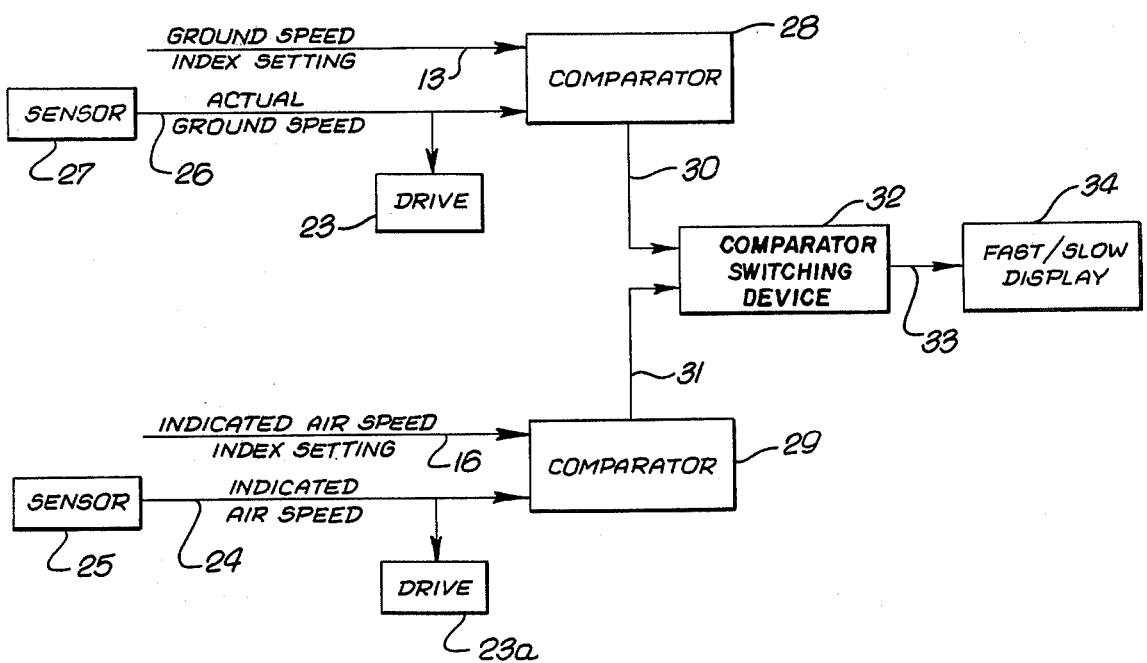
FIG. 2 is a simplified block diagram of a system to operate the fast/slow display as seen in FIG. 1.

Extending the description to FIG. 2, indicated airspeed signals at 24 may be provided by a sensor 25 such as a pitot tube and associated transducer; likewise, acutal groundspeed signals at 26 may be provided by sensor 27. If a ground transmitter, such as an ILS, is updated to transmit on a precise frequency and the receiver in the aircraft tuned to a precise frequency, the Doppler difference can be read out as groundspeed with an associated device to detect the frequency difference. This would most likely require a temperature controlled crystal in the transmitter, one in the receiver, and the associated equipment in the airplane to detect and read out the frequency difference as groundspeed. However, the present approach system and procedures can be utilized regardless of what type of groundspeed detection system is used, as long as it is sufficiently accurate.

In FIG. 2, the groundspeed inputs 13 and 26 are compared in comparator 28, and the airspeed inputs 16 and 24 are compared in comparator 29. The outputs 30 and 31 of the two comparators are then compared at 32, and the lesser valued one of the signals at 30 and 31 (compared to its own index) is selected to provide a command input 33 to the fast/slow indicator or display 34. For example, the command input 33 may be fed to the display proportional drive 33a in FIG. 1. A digital display and drive may alternatively be employed. If the display reads SLOW, the pilot increases power to the aircraft engines until the display reads ZERO; and conversely, if the display reads FAST, the pilot decreases power to the aircraft engines to return the display to ZERO.

Figure 3:
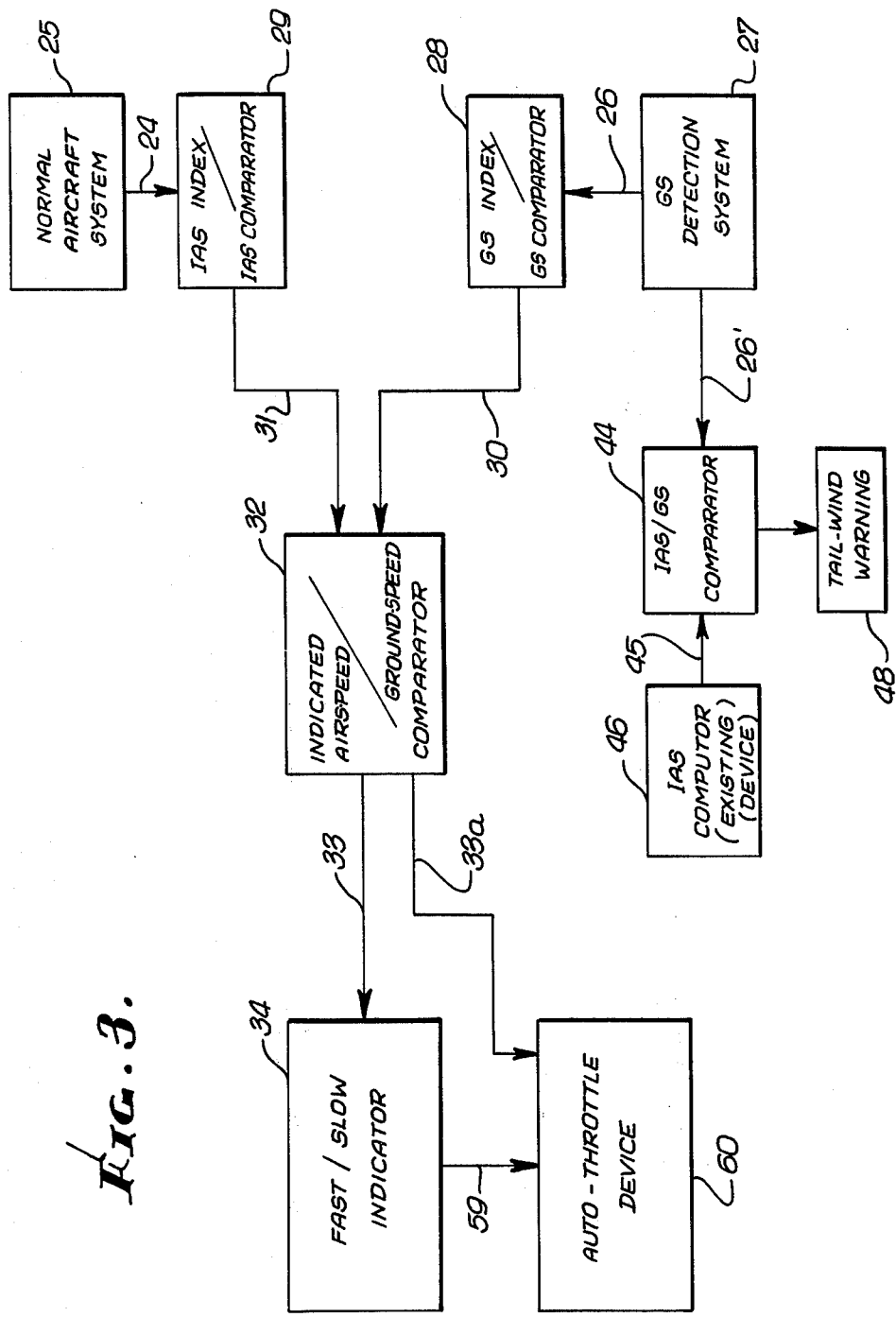
FIG. 3 is a more complete block diagram of a system to operate the fast/slow display as well as other devices.

Referring to the more complete system of FIG. 3, the same numerals are applied to components corresponding to those described in FIG. 2. In addition, the output of the comparator 32 may be fed at 33a (or a signal from the display 34 may be fed at 59) to the automatic throttle control device 60 that controls power to the engines, the purpose being to adjust power to return the reading of fast/slow indicator 34 to zero.

Figure 4:
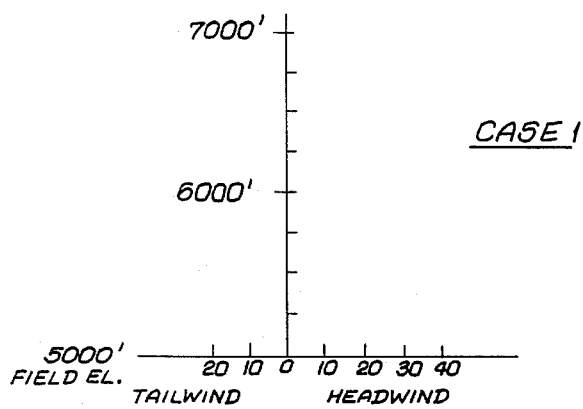
FIG. 4 is a set of diagrams showing index and actual indicated airspeed and groundspeed values for five different cases of wind conditions.
Figure 4:
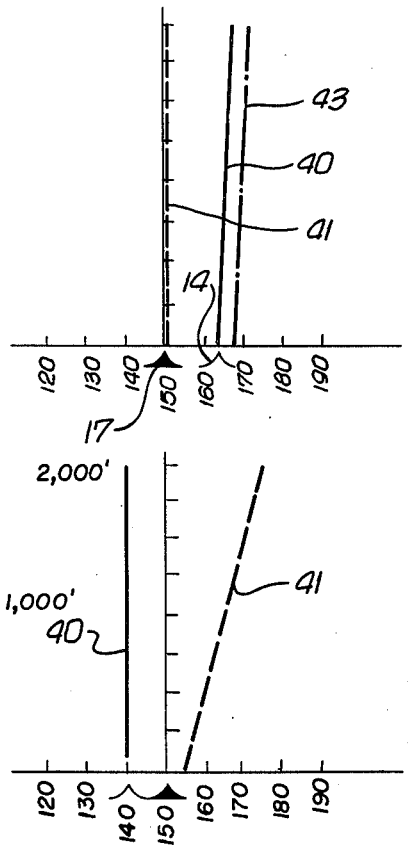
Figure 4:
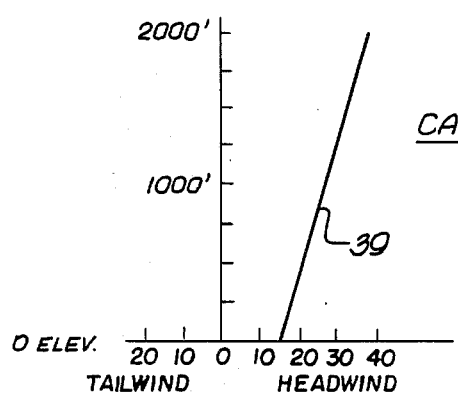
Figure 4:
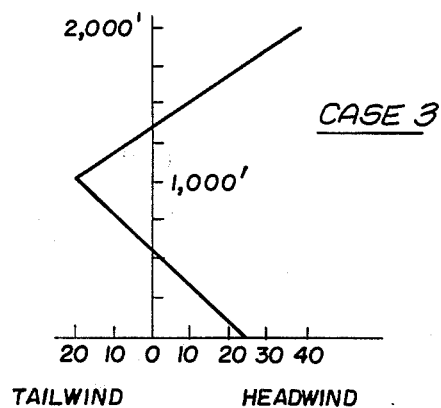
Figure 4:
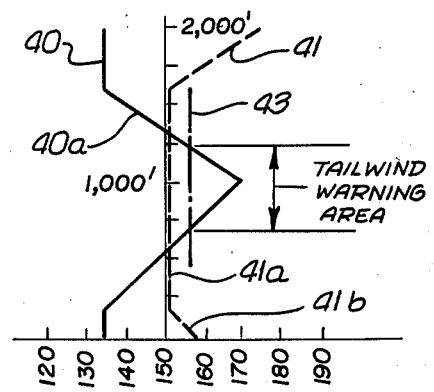
Figure 4:
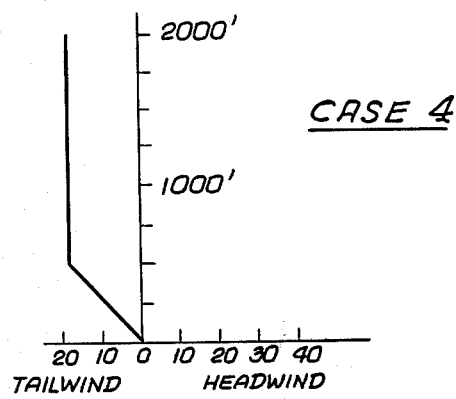
Figure 4:
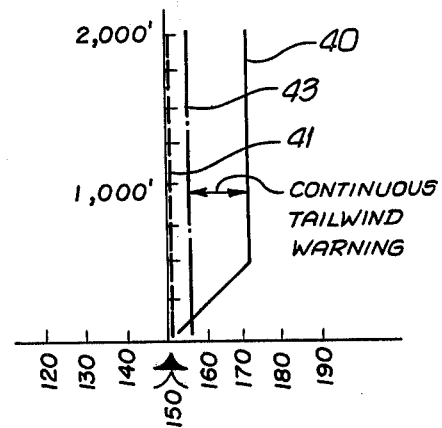
Figure 4:
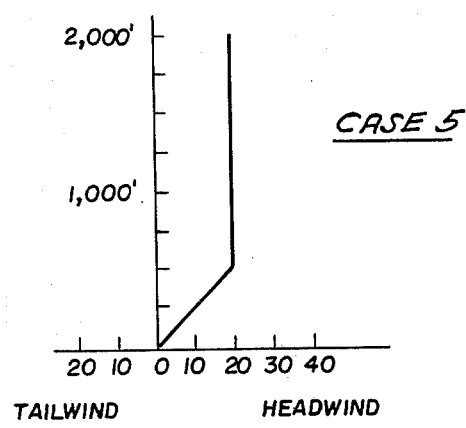
Figure 4:
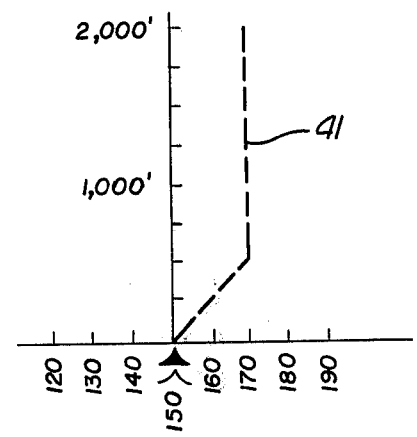

Referring now to FIG. 4, all examples assume the ideal of the pilot accurately controlling power application to hold the fast/slow display at zero.

CASE 1

The left diagram indicates a condition of no tailwind or headwind between the airfield elevation (5000 feet) and 7000 feet altitude. In the right diagram, the groundspeed index marker 14 is set at 164 knots (i.e. for 5000 feet elevation at 20° C). The actual groundspeed needle readings at different elevations are shown by line 40, which is slightly inclined to show corrections for altitude. The airspeed index marker 17 is set at 150 knots, and the indicated airspeed line 41 remains it 150 knots for all altitudes. The fast/slow indicator is in this example commanded by the readout from the airspeed comparator 29, as that readout is the lowest (zero). The purpose of this example is to merely clarify the relationship of all these values relative to altitude. The remaining cases simplify presentation relative to the airport elevation at sea level under standard conditions.

CASE 2

In the left diagram, windline 39 shows that a 40 knot headwind exists at 2000 feet elevation above a sea level airfield, and a 15 knot headwind exists at field level (as related to aircraft approach direction). The pilot sets the airspeed index marker at 150, and the groundspeed index marker at 140 (150 less ⅔×15). The line 40 shows that actual groundspeed is kept at 140 knots during the descent, to keep the fast/slow indicator reading "zero", this implies that the output of the groundspeed comparator 28 is commanding the fast/slow indicator. (The airspeed line 41, at 2000 feet elevation, is shown 26 knots above its index value, i.e. 180−150 =30, corrected to 26 for altitude and temperature). The cases following this will not have altitude corrections, for purposes of simplicity. Altitude correction =2 knots per 1000 feet elevation.

CASE 3

The left diagram shows that a 40 knot headwind at 2000 feet altitude drops to a 20 knot tailwind at 1000 feet; thereafter, the wind increases to a 24 knot headwind at field level. In the right diagram, the pilot sets his airspeed index marker at 150 knots and the groundspeed index marker at 134 (150 less ⅔×24). His indicated airspeed is 174 knots (134 +40) at 2000 feet. During descent to 1600 feet, the output of the groundspeed comparator commands the fast/slow indicator. Upon reaching 1600 feet, the indicated airspeed diminishes to 150 knots due to decreased headwind, so that the airspeed comparator output becomes zero and now commands the fast/slow indicator. Upon continued descent, the tailwind increases, so that actual groundspeed increases as shown by line 41a. When the actual groundspeed reaches 5 knots above true airspeed (150), i.e. reaches 155 it crosses the tailwind warning line 43 and triggers the tailwind warning light to come ON (see in this regard FIG. 3) where the actual groundspeed output 26' of sensor 27 is compared at 44 with the output 45 of TAS 46, which sets the threshold value of line 43 in FIG. 4, case 3. The output 47 of comparator 44 triggers a switch 47a controlling the warning light 48. This indicates to the pilot that he should consider aborting the landing. Whether he does is a matter of his judgement in relation to available altitude to handle the wind shear safely. See also FIG. 1.

In case 3, the groundspeed increases up to 170 knots at the 20 knots tailwind value (1000 feet altitude). Upon further descent, the tailwind diminishes, and as groundspeed drops below line 43, the light 48 goes out The output from the airspeed comparator 29 continues to govern the fast/slow indicator until the actual groundspeed drops to its index setting value 134. At that time, the output of the groundspeed comparator takes over command of the fast/slow indicator, and actual groundspeed remains at 134 (i.e. due to the pilot adjusting power to keep it there, i.e. keep the fast/slow indicator at zero). The indicated airspeed rises at 41b to reach 156 at touch-down.

CASE 4

There is no wind at the sea-level surface, so the two index settings are the same, at 150 knots. At 2000 feet, a 20 knot tailwind exists, so the acutal groundspeed line 40 is at 170 knots. The indicated airspeed is at 150 and is in command of the fast/slow indicator. Tailwind warning light 48 is triggered ON. If these conditions prevail down to 1000 feet, the pilot should abort the landing, and approach the runway from the opposite direction, as represented in case 5. If he should not abort the landing, he is risking a hazardous approach as described in the introduction. He knows this at the start of approach due to the present invention.

CASE 5

The fast/slow indicator is commanded by the groundspeed comparator output. The pilot reduces power as the headwind diminishes, and lands safely. The pilot has an indicated airspeed of 170 knots but he knows his speed relative to the runway is a normal 150 knots, so he knows it is safe to continue his approach, and he further knows that he will encounter wind shear between his present position and the runway. He will also get an immediate indication of its encounter when his indicated airspeed starts to decrease. The groundspeed will still be in command of the fast/slow indicator all the way to touchdown.

Advantages of the above method and apparatus include;

1. The pilot is given his wind component and the difference in wind component compared to that existing in the landing area at the start of his approach.

2. The pilot can monitor the value of any wind shear present constantly throughout his entire approach.

3. The invention makes it known to the pilot if an approach in another direction is safer.

4. The pilot is warned of any hazardous condition of wind component all during the final approach.

5. The pilot can tell from indications at the time of warning what direction will be safer for an approach.

6. The invention automatically adds an airspeed sufficient to counteract any sudden decrease in wind component during final approach.

7. The invention enhances the prospect of arriving over the landing area with a safe speed margin.

8. The invention will assure landing without excessive speed and thus avoid landing distance overruns.

9. The invention adds an additional, relative, consistant quantity to the final approach and windshear problem, which enables the pilot to make consistent, safer and more accurate approaches.

10. The pilot can monitor, and have available during takeoff, an independent and accurate measure of wind component actually existing during take-off.

11. The invention is designed for use as a standard procedure on every approach and take-off, so that the pilot develops high proficiency in its use.

12. The invention eliminates much of the confusion associated with wind shear and thereby frees the pilot to concentrate on other considerations more readily, allowing a more accurate approach, especially during adverse wind shear conditions.

13. The invention allows the pilot to pre-trim the airplane for expected conditions and thereby arrive at the landing area in a safer condition of flight.

14. The invention utilizes a consistent actual speed all during the final approach giving a constant rate of descent on the glide path.

15. The invention includes a tailwind warning device, and gives the pilot information to effectively deal with it.

Prior to take-off, the pilot sets his airspeed index on normal V2, as under present procedures. The groundspeed index should be set in a similar fashion to the approach setting. The V2 sped should be converted to true airspeed by applying field elevation and temperature corrections less two-thirds the headwind component. During take-off, the fast/slow indicator can only be commanded by the airspeed set index (V2); however, the groundspeed and airspeed needles, or indications, can be monitored relative to each other and relative to their indexes to determine the actual instantaneous wind component all during the take-off run. If the needles do not maintain proper relative proportionate values, the pilot will be warned that his wind component is different from his pre-take-off calculated values. In particular, this will inform him if he has a tailwind component prior to reaching V1 speed (decision speed)

I claim:

1. A method of controlling the power to be applied to an aircraft engin during a landing approach, whether windshear conditions exist or not, comprising the steps of:
  a. monitoring deviation of actual airspeed from desired airspeed on the approach and deviation of actual groundspeed from desired approach groundspeed on the approach and,
  b. employing such deviations in such a manner so that the approach speed is controlled by whichever of the speeds is lower compared to the associated desired speed, and using this speed parameter to control power to maintain a stabilized speed condition during the final approach.

2. The method of claim 1 wherein said employing of speed control includes providing an indicator from which a pilot may monitor and control aircraft speed in a stabilized condition on the final approach.

3. The method of claim 1 which includes displaying said deviation of airspeed from a desired value and said deviation of groundspeed from a desired value.

4. A method of controlling the power to be applied to an aircraft engine during a landing approach, whether windshear conditions exist or not, comprising the steps of:
  a. monitoring deviation of actual airspeed from desired approach airspeed on the approach and deviation of actual groundspeed from desired groundspeed on the approach,
  b. employing such deviations in such a manner so that the approach speed is controlled by whichever of the speeds is lower compared to its associated desired value, and using this speed parameter to control power to maintain a stabilized speed condition during the final approach, and providing a coaxially rotating display of both deviations of airspeed compared to a pre-set value, and deviations of groundspeed compared to its own pre-set value, so that these deviations indicate present conditions compared to conditions in a landing area, and using said lower value to provide a stabilized speed condition on the approach by controlling power application.

5. A method of providing a display useful in the determination of power to be applied to an aircraft during an approach procedure, comprising the steps of:
  a. determining a first value indicative of a desired aircraft groundspeed on the approach;
  b. determining a second value indicative of a desired aircraft airspeed on the approach;
  c. determining a third value indicative of actual aircraft groundspeed;
  d. determining a fourth value indicative of actual aircraft indicated airspeed;
  e. determining a fifth value indicative of the difference between said first and third value, and a sixth value indicative of the difference between said second and fourth values;
  f. comparing said fifth and sixth values to determine which is the lower speed value compared to its associated desired value;
  g. providing a fast/slow display controlled by said lesser value.

6. The method of claim 5 wherein said fifth value is determined to indicate the amount by which said third value exceeds said first value to ascertain a quantitative value of either a lesser headwind than in a landing area or the existence of a present tailwind and its value and deduce the windshear existing ahead and its value.

7. The method of claim 5 wherein said sixth value is determined to indicate the amount by which said fourth value exceeds said second value to ascertain a quantitative value of the amount of excess headwind existing at present compared to that existing in the landing area and thereby deduce how much windshear exists ahead before reaching the landing area.

8. An apparatus useful in determining power to be applied to an aircraft engine during a landing approach, comprising
  a. first means for monitoring deviations of acutal aircraft airspeed from desired approach airspeed, and deviations of actual aircraft groundspeed from desired approach groundspeed, and
  b. second means coupled to said first means for providing an indication as to which of said deviations is the lower compared to the associated desired value, from which a pilot can maintain a stabilized speed condition above a safe value by adjusting engine power.

9. The apparatus of claim 8 wherein said second means comprises a fast/slow indicator.

10. The apparatus of claim 8 wherein said first means includes first comparator means to derive signals corresponding to said deviation.

11. The apparatus of claim 8 wherein said second means includes a display of groundspeed relative to an associated index and airspeed relative to an associated index.

12. The apparatus of claim 8 including a comparator into which a groundspeed signal and a true airspeed signal are fed so that when groundspeed exceeds true airspeed by a selected amount a signal from the comparator activates a sensory warning device indicative of tailwind.

13. In apparatus useful in determining power to be applied to an aircraft engine during a landing approach,
 a. first means for monitoring deviations of actual aircraft airspeed from desired approach airspeed, and deviaions of actual groundspeed from desired approach groundspeed, and
 b. second means coupled to said first means for providing an indication from which a pilot may execute an approach at a stabilized speed safely above, but not below a safe speed regardless of the presence or lack of windshear,
 c. said first means including first comparator means to derive signals corresponding to said deviations, and said second means including second comparator means responsive to said signals to derive another signal corresponding to said indication for throttle control.

14. In apparatus useful in determining power to be applied to an aircraft engine during a landing approach,
 a. first means for monitoring deviations of actual aircraft airspeed from desired approach airspeed, and deviation of actual aircraft groundspeed from desired approach groundspeed, and
 b. second means coupled to said first means for providing an indication from which an aircraft pilot may execute a speed stabilized approach by controlling power application,
 c. said first means including GS instrumentation to provide a GS signal indicative of actual groundspeed of the aircraft, there being additional TAS instrumentation to provide a TAS signal indicative of a selected tailwind threshold value, and including comparator means operatively coupled with said GS and TAS instrumentation to compare said GS and TAS signals and to provide a sensory warning when the GS signal exceeds the TAS signal by a predetermined amount.

15. The apparatus of claim 14 wherein said first means includes:
 $a_1$. first adjustable means displaying a first value indicative of a selected aircraft groundspeed on the approach,
 $a_2$. second adjustable means displaying a second value indicative of a selected aircraft airspeed on the approach,
 $a_3$. an actual groundspeed indicator moveable relative to said displayed first value to thereby indicate any deviation of actual groundspeed above a selected groundspeed to show a tailwind or lack of headwind existing compared to that existing in the landing area,
 $a_4$. an indicated airspeed indicator movable relative to said displayed second value to thereby indicate any deviation of indicated airspeed from selected airspeed to show the difference in headwind existing compared to that in the landing.

16. The apparatus of claim 15 wherein said actual groundspeed and indicated airspeed are coaxially presented.

17. The apparatus of claim 15 including structure carrying said airspeed and groundspeed indicators in close proximity and said fast/slow indicator in relatively close proximity ot the others to effect a display relative to wind-shear.

18. In the method of determining the speed to be used by an airplane on the landing approach, such speed designed to be safe before or after the encounter of any windshear which may be present on the final approach, the steps which include:
 a. monitoring actual airspeed as compared to desired airspeed on the approach, and actual groundspeed as compared to desired groundspeed on the approach and,
 b. employing these speed values in such manner that either may be higher than an associated desired value, but the one lowest compared to the associated desired set-up value will form the criteria for speed control at any moment on the approach.

19. The method of claim 18 wherein an employing of deviations from said desired speeds provides a second indication of the value of wind component difference from that existing in a landing area, and is also used in such a manner as to maintain a safe stabilized speed on the approach relative to stall and control before, during, and after any possible windshear or lack of windshear.

20. The method of claim 18 which includes displaying said deviations in such manner that the pilot is continuously aware of windshear values ahead.

21. The method of claim 18 which includes determining which: indicated airspeed compared to an associated index, or groundspeed compared to an associated index, has the lower value, so that the speed control function of the fast/slow indicator and the engine power are controlled by whichever speed indicates a lower speed value relative to its associated desired speed index.

22. The method of claim 21 wherein if groundspeed is the lower compared to an associated index and is in control of the fast/slow indicator, and the fast/slow indicator is maintained on zero the amount the indicated airspeed exceeds its index is a measure of the amount of windshear, or decrease in headwind a pilot may expect somewhere between his present position and in a landing area.

23. The method of claim 21 wherein if the indicated airspeed is the lowest compared to an associated index and is in control of the fast/slow indicator and the fast/slow indicator is maintained on zero, the groundspeed in excess of an associated index indicates the amount the present headwind is less than that in the landing area, and if the groundspeed exceeds the zero wind true airspeed value the amount it exceeds it is a measure of the tailwind component at that time.

* * * * *